United States Patent
Wildner et al.

(10) Patent No.: US 12,078,792 B2
(45) Date of Patent: Sep. 3, 2024

(54) METHOD OF PROVIDING AN ASSEMBLED IMAGE USING A DIGITAL MICROSCOPE, DIGITAL MICROSCOPE SYSTEM, AND PROGRAM FOR PROVIDING AN ASSEMBLED IMAGE USING A DIGITAL MICROSCOPE

(71) Applicant: PreciPoint GmbH, Freising (DE)

(72) Inventors: Ludwig Wildner, Freising (DE); Andreas Schmid, Freising (DE)

(73) Assignee: PreciPoint GmbH, Freising (DE)

( * ) Notice: Subject to any disclaimer, the term of this patent is extended or adjusted under 35 U.S.C. 154(b) by 109 days.

(21) Appl. No.: 17/777,186

(22) PCT Filed: Nov. 13, 2020

(86) PCT No.: PCT/EP2020/082067
§ 371 (c)(1),
(2) Date: May 16, 2022

(87) PCT Pub. No.: WO2021/094542
PCT Pub. Date: May 20, 2021

(65) Prior Publication Data
US 2022/0404604 A1    Dec. 22, 2022

(30) Foreign Application Priority Data
Nov. 15, 2019  (EP) .................................... 19209393

(51) Int. Cl.
*G02B 21/36*    (2006.01)
*G02B 21/26*    (2006.01)
(Continued)

(52) U.S. Cl.
CPC ........... *G02B 21/367* (2013.01); *G02B 21/26* (2013.01); *H04N 23/62* (2023.01); *H04N 23/667* (2023.01); *H04N 23/815* (2023.01)

(58) Field of Classification Search
CPC .... G02B 21/367; G02B 21/26; H04N 23/667; H04N 23/62; H04N 23/815
(Continued)

(56) References Cited

U.S. PATENT DOCUMENTS 6,522,774 B1    2/2003  Bacus
2003/0016301 A1  1/2003  Aizaki
(Continued)

FOREIGN PATENT DOCUMENTS

DE      69838297         10/2007
DE   102016107272 A1    10/2017
(Continued)

OTHER PUBLICATIONS

Medline Industries Ltd, "Precipoint M8 Digital Microscope & Scanner", Dec. 12, 2016, https://www.youtube.com/watch?v=OrlvMqeHEWO.
(Continued)

*Primary Examiner* — Sherrie Hsia
(74) *Attorney, Agent, or Firm* — Getz Balich LLC

(57) ABSTRACT

A method of providing an assembled image using a digital microscope, the digital microscope having an optical system, an image sensor having a predefined number of image pixels, and a stage, the stage being movable in relation to the optical system and the image sensor, includes receiving a user selection regarding an area of interest of the sample, the user selection indicating the position and extension of the area of interest, selecting one of a full resolution mode or and a reduced resolution mode, wherein individual images with a reduced number of image pixels are generated, moving the stage with respect to the optical system and the image sensor, and generating individual images of the area of interest in accordance with the selected one of the full resolution mode or the reduced resolution mode, and com-
(Continued)

bining the individual images into the assembled image, representing the area of interest.

15 Claims, 5 Drawing Sheets

(51) Int. Cl.
  *H04N 23/62* (2023.01)
  *H04N 23/667* (2023.01)
  *H04N 23/80* (2023.01)

(58) Field of Classification Search
  USPC .......................................................... 348/79
  See application file for complete search history.

(56) References Cited

U.S. PATENT DOCUMENTS

| | | | |
|---|---|---|---|
| 2003/0210262 | A1 | 11/2003 | Gahm |
| 2010/0194873 | A1 | 8/2010 | Viereck |
| 2013/0128024 | A1* | 5/2013 | Kishima ............ G01N 21/6428 348/79 |
| 2015/0185464 | A1* | 7/2015 | Karube ................ H04N 13/275 348/44 |

FOREIGN PATENT DOCUMENTS

| | | |
|---|---|---|
| DE | 102018104704 A1 | 9/2019 |
| DE | 102019203963 A1 | 9/2019 |
| JP | 2009025362 A | 2/2009 |
| WO | 9844446 W | 10/1998 |
| WO | 2006028439 A1 | 3/2006 |
| WO | 2017211584 A1 | 12/2017 |
| WO | 2017215707 A2 | 12/2017 |
| WO | 2018134129 A1 | 7/2018 |
| WO | 2019097524 A1 | 5/2019 |

OTHER PUBLICATIONS

Meyer, Robert, "PreciPoint M8 Remote Contol Scanner-Microscope for Frozen Sections", Jun. 17, 2017, https://www.youtube.com/watch?v=hi7XifyGgVY.
PreciPoint GmbH, "2018_03_29_M8_small-1", Mar. 29, 2018.
PreciPoint GmbH, "Digital Microscope & Scanner—PreciPoint M8", Mar. 6, 2017, https://www.youtube.com/watch?v=blBm4qX8JBs.
PreciPoint GmbH, "PreciPoint M8 InstantScan Mode—a revolutionary improvement to virtual microscopy", Mar. 5, 2015, https://www.youtube.com/watch?v=JVKojlzE4tk.
PreciPoint GmbH, "PreciPoint M8teaser_EN", Apr. 25, 2019.
Opposition for EP19209393.8 filed Apr. 26, 2023.

* cited by examiner

METHOD OF PROVIDING AN ASSEMBLED IMAGE USING A DIGITAL MICROSCOPE, DIGITAL MICROSCOPE SYSTEM, AND PROGRAM FOR PROVIDING AN ASSEMBLED IMAGE USING A DIGITAL MICROSCOPE

This application claims priority to PCT Patent Appln. No. PCT/EP2020/082067 filed Nov. 13, 2020, which claims priority EP Patent Appln. No. 19209393.8 filed Nov. 15, 2019, which are herein incorporated by reference.

BACKGROUND OF THE INVENTION

1. Technical Field

The present invention is in the field of digital microscopy. In particular, the present invention is in the field of generating a digital image of a portion of a sample viewed via a digital microscope.

2. Background Information

Recent advances in technology aim at replacing conventional analog microscopes with digital microscopes. Current digital microscopes commonly operate in one of the following two operating modes. In one operating mode, the digital microscope is operated like a conventional analog microscope. The stage, holding the sample to be viewed, is driven to a desired location, and a single image is taken via the camera of the digital microscope, the single image corresponding to the position of the stage. The single image is presented to the user. In another operating mode, the user requests an image of the sample, and the microscope completes a row-wise or column-wise scan of the sample, assembling the image of the sample from the individual images taken during the scanning. These operating modes of current digital microscopes are not well-suited to all usage scenarios of digital microscopes.

Accordingly, it would be beneficial to provide a digital microscope system and a method of providing an assembled image using a digital microscope that allow for an improved handling by the user.

SUMMARY OF THE INVENTION

Exemplary embodiments of the invention include a method of providing an assembled image using a digital microscope, the digital microscope having an optical system, an image sensor having a predefined number of image pixels, and a stage for holding a sample, the stage being movable in relation to the optical system and the image sensor, the method comprising receiving a user selection regarding an area of interest of the sample, the user selection indicating the position and extension of the area of interest; depending on the user selection, selecting one of a full resolution mode, wherein individual images with the predefined number of image pixels are generated, and a reduced resolution mode, wherein individual images with a reduced number of image pixels, as compared to the predefined number of image pixels, are generated; moving the stage with respect to the optical system and the image sensor, and generating individual images of the area of interest in accordance with the selected one of the full resolution mode and the reduced resolution mode; and combining the individual images into the assembled image, representing the area of interest.

Exemplary embodiments of the invention allow for an adaptation of the generation of the individual images, which eventually combine to the assembled image, to the user selection regarding an area of interest of the sample. An image of that portion of the sample that the user is truly interested in may be provided with an optimized trade-off between image quality and speed of provision. In particular, by providing a selection between the full resolution mode and the reduced resolution mode for the generation of the individual images, the faster image processing of individual images with a reduced number of image pixels may be taken advantage of in case the user selection indicates that a comparably small resolution of the desired sample image is sufficient. For example, in case the user selection indicates that the user is interested in a rather large portion of the sample, i.e. in case the user selection indicates that the extension of the area of interest is rather large, the reduced resolution mode may be selected and the comparably large number of individual images, needed for generating a representation of said comparably large portion of the sample, may be achieved with superior speed, as compared to using the full resolution mode. In other words, based on the assumption that a user who is interested in a rather large portion of the sample is satisfied with a less than maximum resolution of the assembled image, the reduced resolution mode may be selected, thus improving the speed in generating the assembled image without compromising the user's needed resolution for the momentary use case. In case the user selection indicates a rather small area of interest, the full resolution mode may be selected. In that case, the comparably lower number of individual images, needed for generating the assembled image, may still be provided in a rather fast operation, and the user is provided with high image quality for the selected small area of interest.

The digital microscope has an optical system. The optical system may be any kind of optical system suitable for providing the magnification desired for the digital microscope. In particular, the optical system may comprise an objective lens and a tubus lens. The magnification may be a set value due to the particular optical system arranged in the digital microscope. In particular, the magnification may be set due to the particular objective lens, arranged in the digital microscope.

The digital microscope has a stage for holding a sample. The sample may be provided in the form of a slide. The slide may be positioned on the stage or may be introduced in a device designed specifically for holding slides.

The stage is movable in relation to the optical system and the image sensor. In particular, the digital microscope may have a stage drive assembly that drives the stage with respect to the optical system and the image sensor. The optical system and the image sensor may be substantially stationary in the microscope frame of reference. The stage may be movable in two dimensions via the stage drive assembly, such that a two-dimensional scan of the sample may be carried out. The stage may further be movable towards/away from the optical system and the image sensor. This dimension of movement may be comparably small and may be provided for focusing purposes only.

The digital microscope has an image sensor. The image sensor may be part of a digital camera. Accordingly, it may also be said that the digital microscope has a digital camera having an image sensor. The digital camera may have additional components commonly encountered in a camera, such as a shutter, an image sensor driver, etc.

The method comprises receiving a user selection regarding an area of interest of the sample. The area of interest may also be described as a field of view that the user is interested in. This field of view may in particular be a field of view that the user wants to be displayed on a screen that cooperates with the digital microscope. The area of interest of the sample, which the user is interested in, corresponds to a particular portion of the stage, where said area of interest of the sample is located. Due to this correspondence between the area of interest of the sample and the corresponding portion of the stage, the stage may be moved in a manner to generate individual images of the area of interest.

The term generating individual images of the area of interest refers to generating individual images of individual portions of the sample in the area of interest. The individual images may be generated in a scan of the area of interest. The individual images of neighboring portions of the area of interest may have an overlap.

The user selection indicates the position and extension of the area of interest. In particular, the user selection may implicitly specify the position and extension of the area of interest. For example, a user may make the user selection by zooming into and laterally navigating an image preview of the sample. Such zooming and laterally navigating may be done by a touch screen or via the operation of a mouse or via any other suitable input device. The position and the extension of the area of interest may result from the zooming and navigating with respect to the image preview. It is pointed out that the area of interest of the sample may be selected by the user in any suitable manner, as long as the method receives a user selection, the information of which may allow for a derivation of the position and extension of the area of interest.

In the full resolution mode, individual images are generated with the predefined images of pixels. In contrast thereto, in the reduced resolution mode, individual images with a reduced number of image pixels are generated. The reduced number of image pixels allows for an image data processing of the individual images with enhanced speed. For example, any kind of post-processing filter, which may be applied to the image data of the individual images, may work faster with the reduced number of image pixels. Also, when combining the individual images into the assembled image, any stitching operation may work faster on individual images with the reduced number of image pixels. Accordingly, processing speed of image data may be traded off versus resolution of the assembled image, thus adapting the provision of the assembled image to the user selection. The convenience for the user may be improved in an adaptive manner, and the user's speed in analyzing a sample may be enhanced.

According to a further embodiment, the individual images with the reduced number of image pixels are generated by subsampling the predefined number of image pixels of the image sensor. Subsampling is a particularly efficient way of reducing the predefined number of image pixels of the individual images. In particular, subsampling reduces the number of image pixels right at the source, i.e. right at the image sensor such that all ensuing post-processing is carried out with the reduced number of image pixels. The term subsampling refers to reading out a reduced number of measurements from the image sensor, as compared to the full number of measurements available. In other words, subsampling refers to deliberately disregarding part of the image data that is generated at the image sensor. Subsampling may be done by reading out every n-th image pixel of the image sensor, such as every second or third of fourth image pixel, which subsampling may be applied to both dimensions of the image sensor. By applying subsampling, the read-out time for the image sensor may be reduced and the processing time of all ensuing image processing may be reduced. An increase in speed across the entire image processing chain may be achieved.

According to a further embodiment, the individual images with the reduced number of image pixels are generated by down-scaling of image data generated by the image sensor. Down-scaling of image data is another way of reducing the number of image pixels. As compared to subsampling, as described above, all sensed image data is used. However, the image data for a given set of neighboring pixels may be combined into a single pixel. For example, a single resulting pixel may be calculated from a window of 2×2 original pixels or 3×3 original pixels or 4×4 original pixels or 5×5 original pixels, etc. In this way, the number of image pixels may be reduced, while basing the image data of the reduced number of image pixels on all information sensed by the image sensor. Down-scaling may generally be performed at any point in the image processing chain. It is possible to perform down-scaling of image data right after reading out the image data from the image sensor. In this way, the speed increase due to the reduced number of pixels may be taken advantage of over a large portion of the image processing chain. Down-scaling may be performed in accordance with any suitable down-scaling algorithm. Down-scaling algorithms are known per se to the skilled person.

According to a further embodiment, the stage is moved in an at least partly continuous manner in the reduced resolution mode, with the image sensor capturing image data for the individual images when the stage is moving. In this way, the speed for generating the assembled image can be increased even further in the reduced resolution mode. With the image sensor capturing image data for the individual images when the stage is moving, no time-consuming start/stop operation of the stage is to be performed for capturing the image data for the individual images. Accordingly, the image data for the individual images are generated in quick succession, thus allowing for the full image data for the assembled image to be provided in a comparably very short time frame. The capturing of image data for the individual images during the movement of the stage is particularly beneficial in combination with the subsampling of the predefined number of image pixels of the image sensor. Because the subsampling allows for a faster read-out of the image data captured by the image sensor, the image sensor is quick in getting ready for capturing more image data. In this way, successive image capturing operations during movement of the stage can be achieved without creating any problems in terms of interfering with the read-out of the image sensor. The term at least partly continuous manner refers to a generally continuous motion, which may have stops at some positions. For example, there may be stops after a predefined number of image data capturing operations, in order to reach a well-defined starting point for all components of the digital microscope again. There may further be stops when changing the direction of the movement of the stage, such as when capturing a new row or new column of individual images. However, it is also possible that substantially all or all image data is captured when the stage is moving. It can also be said that at least the majority of image data for the individual images is captured when the stage is moving. This does not preclude some image data to be captured when the stage is stopped.

According to a further embodiment, a moving speed of the stage is selected such that a blurring of the image data is restricted to at most two pixels, in particular to at most one pixel. In other words, the moving speed of the stage is selected such that each point of the sample affects at most three pixels, in particular at most two pixels, in the captured image data. In this way, the moving speed of the stage is adapted to the remainder of the system of the digital microscope. The moving speed of the stage and the level of blurring of image data is another dimension for trade-off between speed in provision of the assembled image and image quality. Accordingly, the handling of the digital microscope may again be adapted to the user selection. The term blurring of image data may refer to the level of blurring in the assembled image.

According to a further embodiment, the stage is moved in an intermittent manner in the full-resolution mode with the image sensor capturing image data for the individual images when the stage is in a stopped position. In this way, the quality of the captured image data is particularly high, as there is no risk of blurring due to the movement of the stage, when capturing the image data. The terminology of moving a stage in an intermittent manner refers to a start/stop movement of the stage, which may also be referred to as a drive/stop movement of the stage. The stage drive assembly may be synchronized with the image sensor, in particular with the exposure times of the image sensor, in order to capture image data exactly at the point in time when the stage is in the stopped position.

According to a further embodiment, the full resolution mode is selected if the extension of the area of interest is smaller than a first threshold. In order words, the full resolution mode is selected if the user is interested in a portion of the sample that is smaller than a threshold size. In this case, it is assumed that the user is interested in a high level of detail. Accordingly, a high resolution and, thus, a high image quality of the assembled image is selected. The first threshold may be a one-dimensional threshold, e.g. applied to the larger dimension of the area of interest, or may be a two-dimensional threshold or may be an area threshold.

According to a further embodiment, the reduced resolution mode comprises a plurality of reduced resolution sub-modes and the step of selecting one of a full resolution mode and a reduced resolution mode comprises selecting one of the full resolution mode and the plurality of reduced resolution sub-modes. In this way, more than two modes of generating the individual images may be provided, thus enabling a more granular adaptation of the selected mode of generating individual images to the user needs. In particular, depending on the extension of the area of interest, a suitable one of the full resolution mode and the plurality of reduced resolution sub-modes may be selected. For this selection, a plurality of thresholds may be provided. Each of the thresholds may be a one-dimensional threshold or a two-dimensional threshold or an area threshold, as described above with respect to the first threshold.

According to a further embodiment, each of the plurality of reduced resolution sub-modes has a respective sub-mode specific reduced number of image pixels for the individual images. In other words, the plurality of reduced resolution sub-modes differ with respect to each other with respect to the reduced number of image pixels. Each of the reduced resolution sub-modes has a different reduced number of image pixels for the individual images. The selection of the one of the full resolution mode and the plurality of reduced resolution sub-modes may be a monotonic function between the extension of the area of interest and the number of image pixels for the individual images in the respective modes. In other words, the smaller the extension of the area of interest, the higher the number of image pixels of the individual images may be.

According to a further embodiment, the plurality of reduced resolution sub-modes differ in at least one of level of subsampling the predefined number of image pixels of the image sensor and a level of down-scaling of image data generated by the image sensor. In a particular embodiment, the plurality of reduced resolution sub-modes may differ in both the level of subsampling the predefined number of image pixels of the image sensor and the level of down-scaling of image data generated by the image sensor. It is also possible that the plurality of reduced resolution sub-modes differ with respect to the capturing of the image data being carried out when the stage is moved in an at least partly continuous manner or when the stage is in a stopped position in the course of an intermittent movement. Further, in case the image data is captured when the stage is moving, the plurality of reduced resolution sub-modes may differ with respect to the stage moving speed. In this way, the trade-off between speed of generation of individual images and, thus, the speed of generation of the assembled image and the quality of the assembled image may be adapted in a particularly granular manner for the plurality of reduced resolution sub-modes.

According to a further embodiment, the plurality of reduced resolution sub-modes has two or three or four or five or six reduced resolution sub-modes. A larger number of reduced resolution sub-modes is possible as well.

According to a further embodiment, the user selection further indicates a representation resolution indicative of a desired resolution of the assembled image. It is possible that the selection of the full resolution mode or the reduced resolution mode or one of the plurality of reduced resolution sub-modes, if applicable, may be based on the desired resolution by the user. In this way, the resulting assembled image may be more directly based on the user's wishes. It is also possible that the selection is based on the technical properties of the system around the digital microscope, such as the screen depicting the assembled image. In a particular embodiment, the representation resolution is indicative of a screen resolution of a screen for depicting the assembled image. In this way, the selection of the full resolution mode or the reduced resolution mode may allow for the provision of a high quality image, taking into account the screen resolution as well as the zoom level on the sample.

According to a further embodiment, the method further comprises displaying the assembled image on a screen. In this way, the result of the method, as described above, is provided to the user in an intuitive manner. The displayed assembled image may form the basis for a further user selection, also referred to as updated user selection herein, such that the user may reach those areas of the sample that he/she is particularly interested in in an iterative manner.

According to a further embodiment, the individual images are displayed on the screen in a stepwise manner. In particular, the individual images may be displayed on the screen, substantially as they become available after capturing the image data. In this way, the user may be provided with information for deciding on the next steps in the analysis of the sample even before the area of interest is fully displayed on the screen. From the perspective of the user, the assembled image is built up on the screen in a stepwise manner. The stepwise building of the assembled image may start in the middle of the area of interest and may move to the edges of the area of interest afterwards. It is also possible that the assembled image is built up in a row-wise or column-wise manner, potentially starting from a center line or from a center column. The building of the assembled image on the screen in a stepwise manner may be carried out to provide an intuitive reception of the assembled image on the part of the user and/or to convey a notion of speed to the user, thus making the handling of the digital microscope more convenient.

According to a further embodiment, the method further comprises receiving an updated user selection regarding an updated area of interest of the sample, the updated user selection indicating the position and extension of the updated area of interest; interrupting the one or more method steps currently being carried out; depending on the updated user selection, re-selecting one of the full resolution mode and the reduced resolution mode; moving the stage with respect to the optical system and the image sensor, and generating individual images of the updated area of interest in accordance with the re-selected one of the full resolution mode and the reduced resolution mode; and combining the individual images into the assembled image, representing the updated area of interest. In this way, the method of providing the assembled image may immediately respond to the user's commands. It may be ensured that the updated area of interest is scanned and transformed into an assembled image without delay due to a previous instance of the method. Accordingly, the user receives the feedback of high responsiveness of the method and can work through the analysis of the sample in a particularly time-efficient manner.

Exemplary embodiments of the invention further include a digital microscope system comprising an optical system; an image sensor having a predefined number of image pixels; a stage for holding a sample; a stage drive assembly for moving the stage in relation to the optical system and the image sensor; and a control unit for controlling generation of image data for an assembled image. The control unit is configured to: receive a user selection regarding an area of interest of the sample, the user selection indicating the position and extension of the area of interest; depending on the user selection, select one of a full resolution mode, wherein individual images with the predefined number of image pixels are generated, and a reduced resolution mode, wherein individual images with a reduced number of image pixels, as compared to the predefined number of image pixels, are generated; control the stage drive assembly to move the stage with respect to the optical system and the image sensor; and control the generation of individual images of the area of interest in accordance with the selected one of the full resolution mode and the reduced resolution mode. The additional features, modifications, and beneficial effects, as described above with respect to the method of providing an assembled image using a digital microscope, apply to the digital microscope system in an analogous manner. In particular, it is herewith explicitly disclosed that the control unit may be configured to carry out above-discussed method steps and/or may be configured to cause the components of the digital microscope to carry out above-described method steps. The digital microscope system may be a digital microscope. It is also possible that the digital microscope system is a distributed system comprising a digital microscope and a data processing device, such as a computer, coupled thereto. The control unit may be provided in one of those entities or may be a distributed component among the digital microscope and the data processing device.

According to a further embodiment, the control unit is configured to control the generation of individual images in the reduced resolution mode by causing at least one of subsampling the predefined number of image pixels of the image sensor and down-scaling of image data generated by the image sensor.

According to a further embodiment, the control unit is configured to control the stage drive assembly to move the stage in an at least partly continuous manner in the reduced resolution mode and to control the image sensor to capture image data for the individual images when the stage is moving.

The digital microscope may be a light microscope. It may have an illumination assembly arranged on the side of the stage that is distal from the optical system and the image sensor.

Exemplary embodiments of the invention further include a program for providing an assembled image using a digital microscope, the digital microscope having an optical system, an image sensor having a predefined number of image pixels, and a stage for holding a sample, the stage being movable in relation to the optical system and the image sensor. The program comprises receiving a user selection regarding an area of interest of the sample, the user selection indicating the position and extension of the area of interest; depending on the user selection, selecting one of a full resolution mode and a reduced resolution mode; instructing the stage to move with respect to the optical system; instructing the image sensor to generate image data; on the basis of the image data, generating individual images of the area of interest with the predefined number of image pixels, if the full resolution mode is selected, and generating individual images of the area of interest with a reduced number of image pixels, if the reduced resolution mode is selected; and combining the individual images into the assembled image, representing the area of interest. The additional features, modifications, and beneficial effects as described above with respect to the method of providing an assembled image using a digital microscope, apply to the program for providing an assembled image using a digital microscope in an analogous manner.

BRIEF DESCRIPTION OF THE DRAWINGS

Further exemplary embodiments of the invention are described with respect to the accompanying drawings, wherein.

DETAILED DESCRIPTION OF THE INVENTION

Figure 1:
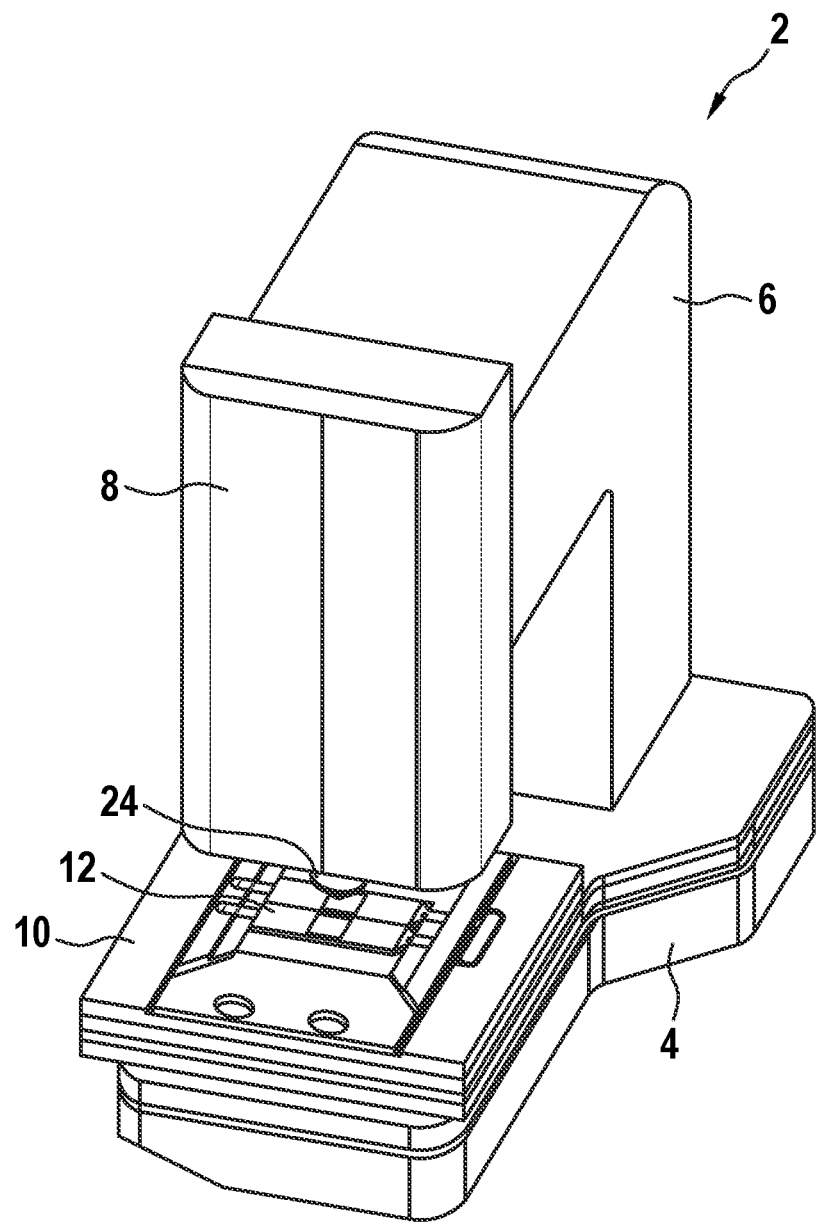
FIG. 1 shows a perspective view of a digital microscope in accordance with an exemplary embodiment of the invention.

FIG. 1 shows a digital microscope 2 in accordance with an exemplary embodiment of the invention in a perspective, three-dimensional view. The digital microscope 2 has a base 4, which supports the digital microscope 2. The base 4 may be placed on a table for providing a secure stand.

The base 4 comprises an illumination assembly and a stage drive assembly, which are blocked from view by a base housing in FIG. 1 and which will be described below. A stage 10 is mounted to the base 4. The stage is movable with respect to the base 4. In particular, the stage 10 is movable in two dimensions, referred to as x- and y-directions herein. In operation, the stage 10 is moved by the stage drive assembly in the x- and y-directions.

The stage 10 has a transparent or translucent portion. A sample may be placed on the transparent or translucent portion. In the operating scenario depicted in FIG. 1, the sample 12 comprises two slides, arranged on the transparent or translucent portion of the stage 10 via a clipping mechanism. In operation, the illumination assembly illuminates the sample 12 from the bottom. The plane of the transparent or translucent portion of the stage 10 is referred to as the x-y-plane of the digital microscope.

The digital microscope 2 further comprises a support arm 6 and a tube assembly 8. The support arm 6 is shaped to support the tube assembly 8, such that the tube assembly 8 hovers over the stage 10. The tube assembly 8 houses various optical components. In particular, the tube assembly 8 houses a digital camera and an optical system, which in turn has a tubus lens structure and an objective lens 24 in the exemplary embodiment of FIG. 1. While the digital camera and the tubus lens structure are blocked from view in FIG. 1 by a tube assembly housing, the objective lens 24 extends somewhat therefrom towards the stage 10.

The tube assembly 8 is movable with respect to the support arm 6 in a moving direction orthogonal to the x-y-plane. In other words, the tube assembly 8 is movable in the z-direction of the microscope frame of reference. While this movement is quite limited, it is sufficient to bring the sample 12 in focus with respect to the optical system contained in the tube assembly 8.

In operation, the stage drive assembly brings the stage 10 to desires positions in the x- and y-directions. The stage drive assembly may have any kind of suitable actuators, such as two small-scale electric motors for the two directions of movement. The illumination assembly provides for illumination of the sample 12 from underneath, and image data of that portion of the sample 12 placed in the way of light from the illumination assembly to the digital camera can be captured by the digital camera. The captured image data is referred to as image data of an individual image herein, as it refers to image data corresponding to a singular position of the stage 10 and, thus, of the sample 12 with respect to the optical system and the digital camera. Via driving the stage 10 to various positions, multiple individual images may be generated.

Figure 2:
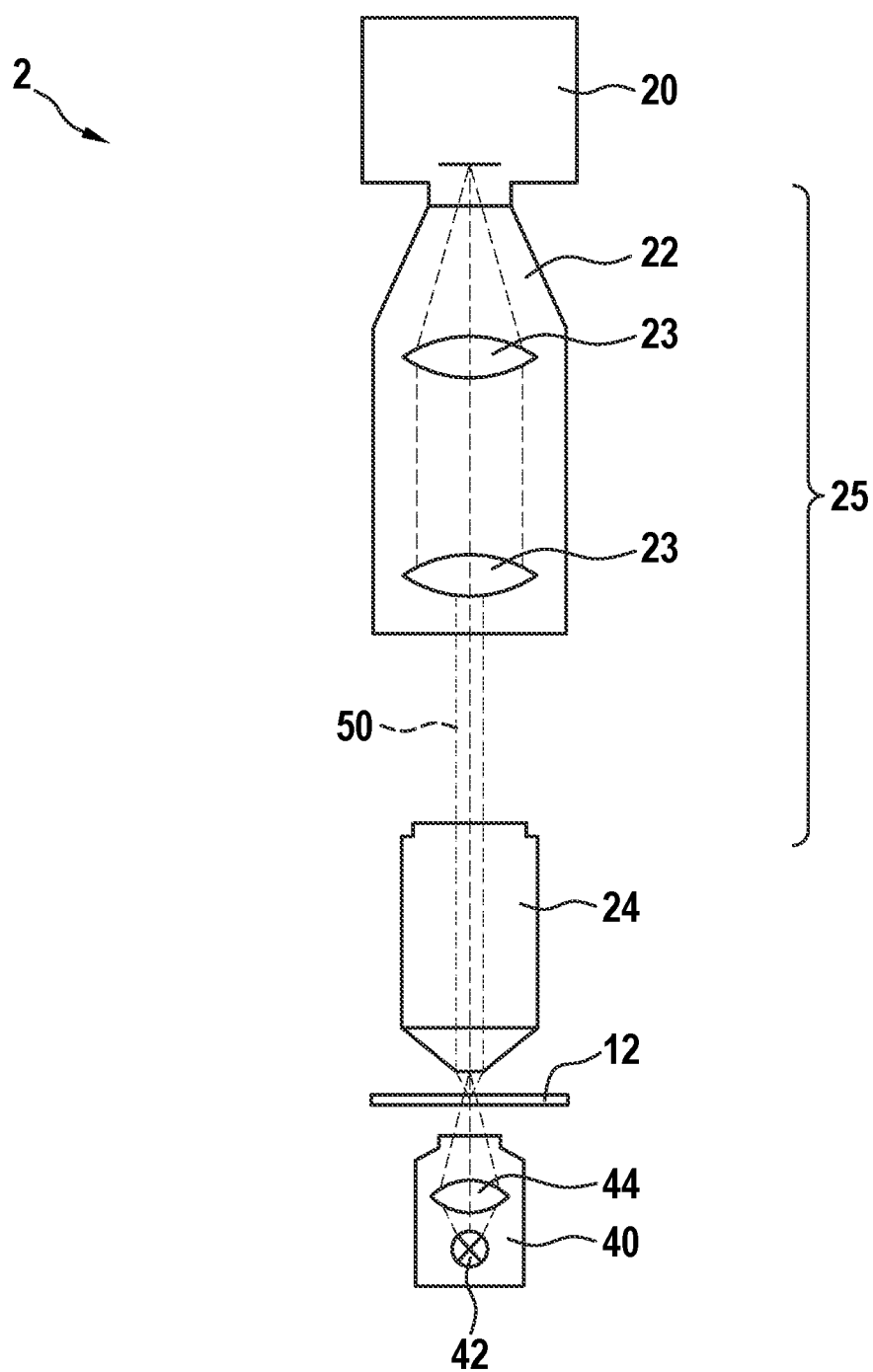
FIG. 2 shows a schematic diagram of selected components of the digital microscope of FIG. 1.

FIG. 2 shows selected components of the digital microscope 2 of FIG. 1 in a schematic view. In particular, FIG. 2 illustrates the components relevant for the illumination of the sample 12 and the directing of light within the tube assembly 8. As described above, the illumination assembly 40 is arranged below the stage 10, i.e. below the sample 12, and directs lights upwards towards the sample 12. In the exemplary embodiment of FIG. 2, the illumination assembly 40 has a light source 42 and a collimating lens 44 for directing a large amount of light towards that portion of the sample 12, whose image is captured. It is pointed out that the illumination assembly 40 may have any suitable set-up/design.

The digital microscope 2 has an optical system 25. In the exemplary embodiment of FIG. 2, the optical system 25 has a tubus lens structure 22 and an objective lens 24. The tubus lens structure 22 has individual tubus lenses 23. The objective lens is provided for achieving a desired magnification of the portion of the sample 12 whose image is captured. In other words, the shape and design of the objective lens 24 sets the magnification of the sample 12 for the resulting individual image. In the exemplary embodiment of FIG. 2, the objective lens 24 has a magnification of 20.

The digital microscope 2 further has a digital camera 20. The digital camera 20 has an image sensor and a shutter. It may also have other components customary in the field of digital cameras, which may contribute to the operation of the digital camera capturing image data. The tubus lens structure 22 directs the light, coming from the objective lens 24, towards the image sensor of the digital camera 20. In this way, a light path 50 from the illumination assembly 40 through the sample 12, through the objective lens 24, through the tubus lens structure 22, and to the image sensor of the digital camera 20 is established.

Figure 3:
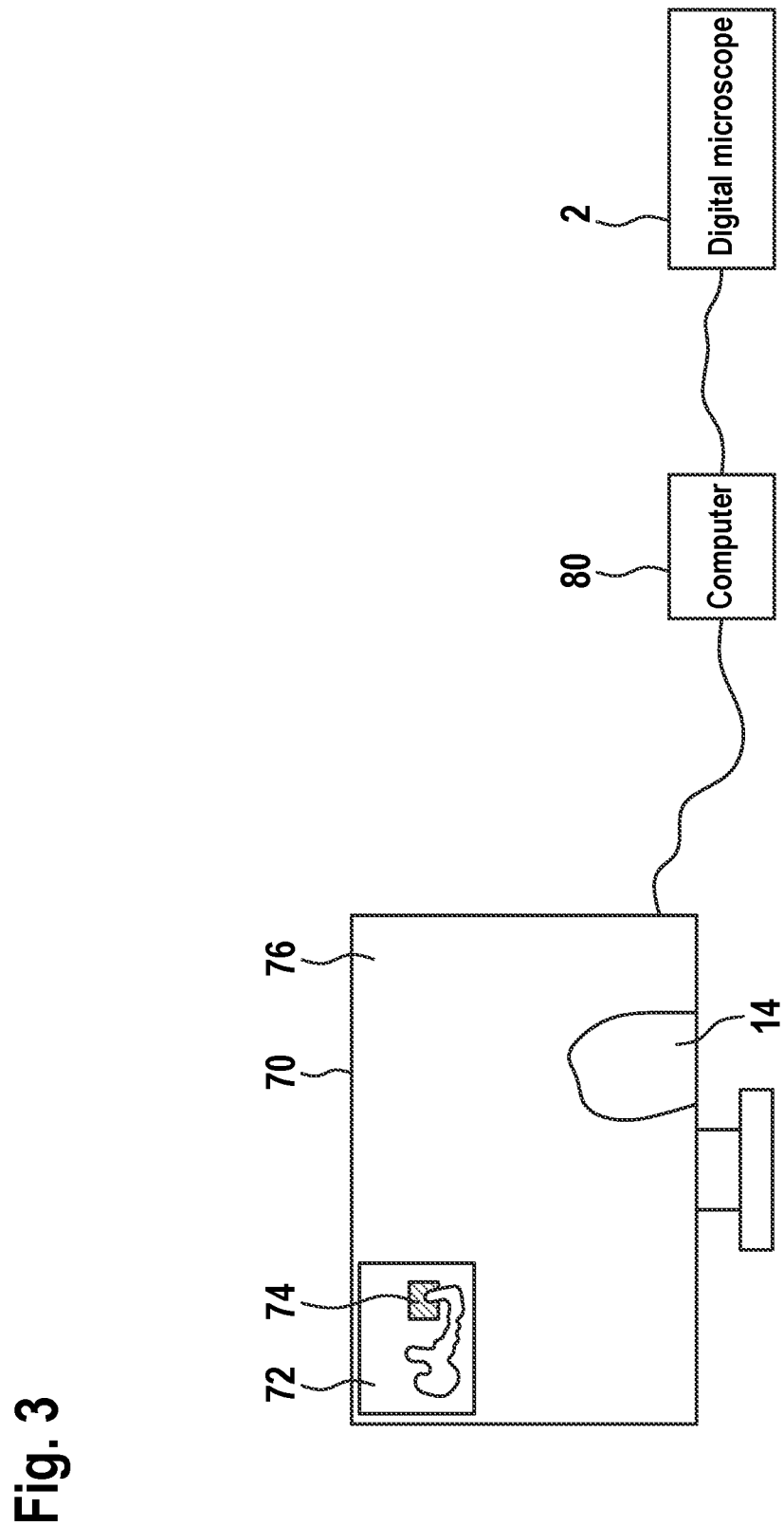
FIG. 3 shows a schematic diagram of a digital microscope system in accordance with an exemplary embodiment of the invention, as seen from a user perspective.

FIG. 3 shows a schematic diagram of a digital microscope system 100 in accordance with an exemplary embodiment of the invention. The digital microscope system 100 comprises a digital microscope 2. The digital microscope 2 may be a digital microscope 2 having the mechanical set-up as described with respect to FIG. 1 above, the optical set-up as described with respect to FIG. 2 above, and the control set-up as will be described below with respect to FIGS. 4 and 5. With respect to FIG. 3, the focus is on the user perspective and the user interaction with the digital microscope system 100.

The digital microscope system 100 further comprises a computer 80, coupled to the digital microscope 2, and a screen 70, coupled to the computer 80. The computer 80 may be any kind of suitable processing device that provides for the interaction between the screen 70 and the digital microscope 2 in a suitable manner. The computer 80 may for example be a standard personal computer, embodied as a desktop computer or a laptop. The processing capacity, exemplarily provided by the computer 80 in the exemplary embodiment of FIG. 3, may also be embedded into the digital microscope 2 or into the screen 70. The screen 70 may for example be part of a tablet or a smartphone, having both the screen functionality and the processing functionality for interfacing directly with the digital microscope 2. It is also possible that the processing capacity, exemplarily provided by the computer 80 in the exemplary embodiment of FIG. 3, may be provided on a remote processing device, such as a remote server as part of a cloud-based solution.

The screen 70 is the control interface for the user of the digital microscope system 100. In the exemplary embodiments of FIG. 3, the screen 70 is a touch screen, so that the screen 70 provides both user input functionality and image output functionality. The user may control the whole operation of the digital microscope system 100 via the touch screen 70. However, it is also possible that other input devices are provided in addition/as an alternative to the touch screen 70. For example, a keyboard and/or a mouse and/or any other suitable input device may be provided for the user to control the digital microscope system 100. It is also possible that multiple screens are provided for the output of images. It is further possible that images are output to other entities. For example, images may be saved to a hard drive or other data storage medium in file format.

In the exemplary embodiment of FIG. 3, the screen 70 provides two different outputs. In the upper left corner of the screen 70, an image preview 72 is displayed. The image preview 72 is an overview image of the sample that is arranged on the stage of the digital microscope 2. The overview image may be taken with an additional digital camera. The additional digital camera may be arranged next to the objective lens 24, i.e. it may be arranged with a viewing direction downwards onto the sample and arranged offset from the objective lens 24. The additional digital camera may be a low-quality, simple digital camera, with the sole purpose of providing a quick overview over the sample having sufficient detail to allow for a coarse navigation of the sample by the user. It is pointed out that the image preview 72 may be generated in any other suitable manner as well. It is also possible that the image preview 72 is entirely dispensed with and that the user navigates through the sample without such an image preview 72.

In the exemplary use case of FIG. 3, the sample is a biological sample. The sample comprises a cell culture 14, arranged on a clear slide. Hence, from the user's perspective, the sample comprises the cell culture 14, surrounded by empty space.

In the exemplary embodiment of FIG. 3, the user may select an area of interest 74 in the image preview 72. The selection of the area of interest 74 is a user selection that determines the operation of the digital microscope and that determines what will be displayed on the screen 70. This will be explained in detail below. The user selection may be made in any suitable manner, such as with the user's fingers on the touch screen, with a suitable stylus, with an ancillary input device, such as a mouse, with menu-based selection tools, etc. For the depicted use case, it is assumed that the user selected the area of interest 74 with his/her fingers on the touch screen in the portion of the screen 70 where the image preview 72 is depicted. The user selection is indicative of the position and extension of the area of interest. In other words, the user selection contains an unambiguous determination, which portion of the sample is the area of interest for the user. The unambiguous determination may be in any form that allows for the derivation of the position and extension of the area of interest. For example, the user selection, as seen from the digital microscope system 100, may comprise the coordinates of the bottom left corner of the area of interest as well as the two-dimensional extension in the x-y coordinate system of the image preview 72. In another example, the user selection, as seen from the digital microscope system 100, may comprise the coordinates of the top left corner and the bottom right corner of the area of interest. In yet another example, the user selection, as seen from the digital microscope system 100, may comprise a single coordinate, such as the center coordinate of the area of interest, and a zoom level as compared to the size of the entire sample.

On the basis of the user selection, the digital microscope system 100 generates an assembled image, which corresponds to the area of interest 74 and which is displayed in the assembled image screen portion 76. The details of said generation of the assembled image from a system point of view will be described below with respect to FIGS. 4 and 5. From the user point of view, the selection of the area of interest 74 results in an assembled image, which is highly magnified as compared to the image preview 72, in the assembled image screen portion 76, with the assembled image corresponding to the area of interest 74 of the sample. The term corresponding does not necessarily mean that the area of interest and the assembled image are perfectly congruent. For example, it is also possible that the displayed assembled image shows a somewhat larger portion of the sample than the area of interest 74, such as for matching the dimensions of the screen 70.

In the exemplary embodiment of FIG. 3, the assembled image screen portion 76 covers the entire screen 70, with the exception of the image preview 72. It is also possible that the user makes the user selection in the assembled image screen portion 76. For example, the user may navigate the virtual representation of the sample, which may extend beyond the screen 70, via lateral translation and zooming operations. In a particular example, the user may use two-finger zooming commands, as are for example known from smartphone applications. The extension of the area of interest may also be referred to as a zoom level of the area of interest. A user selection comprising the position and the zoom level of the area of interest is therefore also an indication of the position and the extension of the area of interest. In a particular example, the image preview, as taken by a low-quality additional camera, may be initially shown on the full screen, with the user navigating to the area of interest purely by lateral translation and zooming operations.

Figure 4:
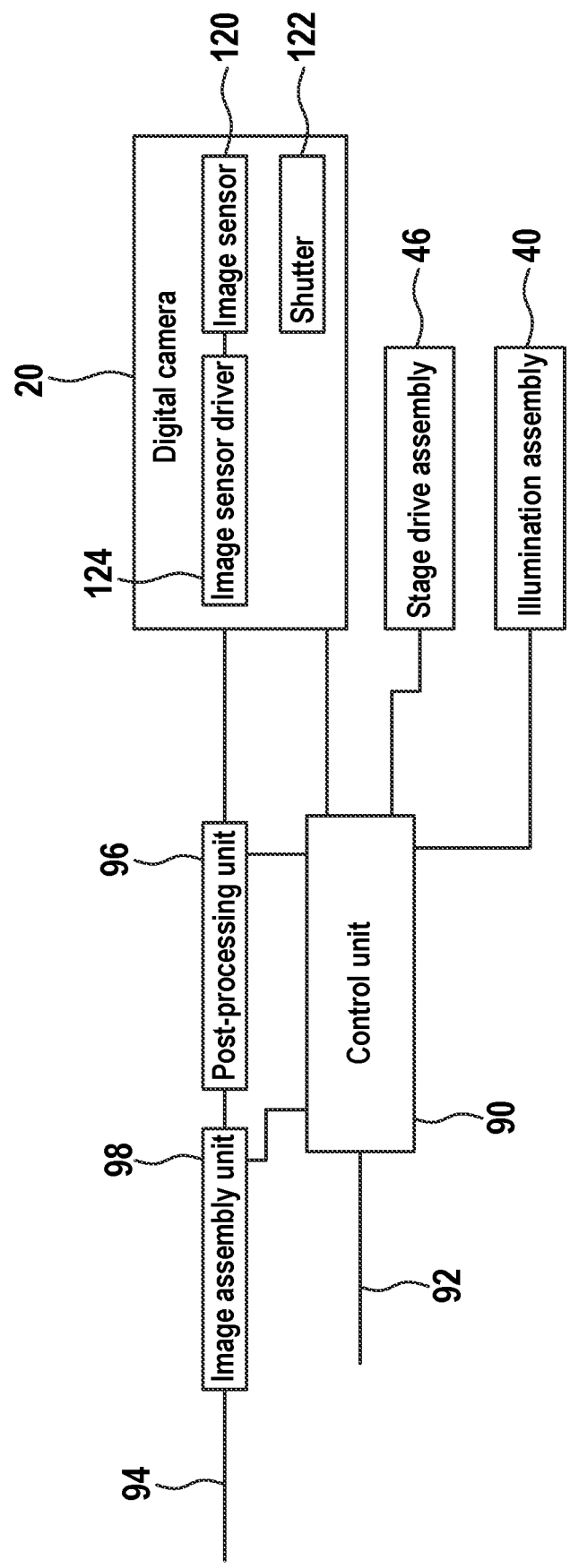
FIG. 4 shows a block diagram of selected components of the digital microscope system of FIG. 3.

FIG. 4 shows a block diagram of selected components of the digital microscope system 100 of FIG. 3. While FIG. 3 had its focus on the user front-end and the user interaction with the digital microscope system 100, the system side, including the hardware backend and the interposed control structure, are described with respect to FIG. 4. The selected components depicted in FIG. 4 have two external connections, namely a user selection input 92 and as assembled image output 94. These two external connections may be seen as the interfaces to the touch screen 70 of FIG. 3. While the user selection is communicated from the touch screen 70 to the components of the digital microscope system 100 of FIG. 4 via the user selection input 92, said components return the assembled image in suitably encoded form to the touch screen 7 for display on the assembled image screen portion 76 via the assembled image output 94.

As stated above, selected components of the digital microscope system 100 are depicted in FIG. 4. In particular, the digital camera 20, the illumination assembly 40, and a stage drive assembly 46, as already described above, are depicted in FIG. 4. The digital camera 20 comprises an image sensor 120, a shutter 122, and an image sensor driver 124. When the shutter 122 opens, the image sensor 120 captures image data, with the image sensor driver 124 reading out the captured image data from the image sensor 120.

The digital microscope system 100 further comprises a control unit 90, an image data post-processing unit 96, and an image assembly unit 98. Each of the control unit 90, the image data post-processing unit 96, and the image assembly unit 98 may be provided in the digital microscope 2 or in the computer 80 or on a remote server. In the alternative, it is also possible that each of these components is provided in the screen 70. Also, the control unit 90, the image data post-processing unit 96, and the image assembly unit 98 may be distributed among the digital microscope system 100. Further, each of the control unit 90, the image data post-processing unit 96, and the image assembly unit 98 may have hardware components or software components or mixed hardware and software components. In the exemplary embodiment of FIG. 4, the control unit 90, the image data post-processing unit 96, and the image assembly unit 98 are part of a software program that is run on the computer 80 and that is configured for controlling the digital microscope 2.

The control unit 90 is coupled to the user selection input 92 for receiving the user selection regarding the area of interest of the sample. The control unit 90 is further coupled to the illumination assembly 40, to the stage drive assembly 46, and to the digital camera 20. The control unit is configured to control the illumination assembly 40, the stage drive assembly 46, and the digital camera 20, in particular the shutter 122 thereof and the image sensor driver 124 thereof, depending on the user selection.

The control unit 90 is further coupled to the image data post-processing unit 96 and to the image assembly unit 98. Further, the digital camera 20 is coupled to the image data post-processing unit 96, which in turn is further coupled to the image assembly unit 98, which in turn is further coupled to the assembled image output 94. In this way, the control unit 90 is able to control the image processing chain downstream of the digital camera 20, as will be described below.

On the basis of the user selection, the control unit 90 determines which individual images of the sample are generated, in order to generate an assembled image that corresponds to the area of interest, as indicated by the user selection. With the image sensor 120 having a predefined number of image pixels and with the optical system of the digital microscope 2 having a set magnification, it is set by system parameters how big of a portion of the sample is translated into image data for an individual image. In other words, the size of the portion of the sample that can be captured with a one-time operation of the shutter 122 of the digital camera 120 is set. Given this set size, the control unit 90 determines on the basis of the position and extension of the area of interest, at which individual positions of the sample image data for individual images is captured. For example, the individual positions for a row-wise or column-wise scan of the area of interest may be determined by the control unit 90. The control unit 90 then controls the stage drive assembly 46, the shutter 122, and the image sensor driver 124 in a synchronized manner to generate image data at the determined individual positions. The control unit 90 may control the illumination assembly 40 to provide continuous illumination or to provide intermittent illumination synchronized with the other components.

The control unit 90 not only controls the positions at which image data for individual images is captured. On the basis of the user selection, the control unit 90 also determines whether a full resolution mode is used for generating the individual images or whether a reduced resolution mode is used for generating the individual images. In case a plurality of reduced resolution sub-modes are provided in the digital microscope system 100, the control unit selects one of the full resolution mode and the plurality of reduced resolution sub-modes for generating the individual images. In the exemplary embodiment described with respect to FIG. 4, two reduced resolution sub-modes are provided in the digital microscope system 100, and the control unit 90 selects one of the three different modes for generating the individual images on the basis of the user selection.

As stated above, the image sensor 120 has a predefined number of image pixels. For the full resolution mode, the individual images have the predefined number of image pixels. The image sensor driver 124 reads out the predefined number of image pixels and the image post-processing unit 96 performs any desired kind of post-processing, such as color filtering or other filtering, on image data with the predefined number of image pixels. The individual images, as output by the image post-processing unit 96, have the predefined number of image pixels.

In the digital microscope system 100 of FIG. 4, there are two ways of reducing the number of image pixels for the one or more reduced resolution modes. The first way of reducing the number of image pixels is subsampling the predefined number of image pixels. In particular, the image sensor driver 124 is capable of subsampling the predefined number of image pixels of the image sensor. In other words, the image sensor driver 124 is able to read out a smaller number of image pixels than the predefined number of image pixels. For example, the image sensor driver 124 may be capable of reading out image data for every other or every third or every fourth etc. image pixel, i.e. every n-th image pixel in general terms. In particular, the image sensor driver 124 may be capable to read out every n-th image pixel in both dimensions of the image sensor 124. For the exemplary case of image data for every second pixel being read out by the image sensor driver 124, the number of image pixels is reduced by a factor of 4. For the exemplary case of image data for every third pixel being read out by the image sensor driver 124, the number of image pixels is reduced by a factor of 9.

Subsampling the predefined number of image pixels allows for speeding up the generation of the assembled image in a two-fold manner. First, the reading out of image data from the image sensor 120 is accelerated. In other words, a shorter amount of time is required for reading out the image data from the image sensor 120 per individual image. In this way, the image sensor 120 is ready for new image data more quickly, and image data for subsequent individual images can be captured in quicker succession. Hence, capturing of image data can be accelerated. Second, a smaller amount of image data is provided downstream of the digital camera 20. In particular, a smaller amount of image data is provided to the image post-processing unit 96 and to the image assembly unit 98. The image processing operations, carried out in these downstream units of the digital camera 20, are carried out faster due to the lower number of image pixels.

The second way of reducing the number of image pixels is down-scaling of image data captured by the image sensor 120. In particular, the image post-processing unit 96 is capable of down-scaling the image data captured by the image sensor 120. The term down-scaling refers to reducing the number of pixels by an image filtering operation. In an exemplary case of down-scaling, 4 pixels of a 2×2 pixel window may be replaced by a single pixel. The single replacement pixel may be the result of a comparably simple operation, such as an averaging of the 4 pixels in the 2×2 pixel window. In this way, the number of image pixels is reduced by factor of 4. This approach may be extended to larger pixel windows. It is also possible that a more elaborate approach for calculating replacement pixels is employed. For example, larger image structures, such as contours, may be taken into account for calculating the replacement pixels. Down-sampling is per se known, and it is apparent to the skilled person that various down-sampling approaches may be used.

The down-sampling of image data may be carried out at different points in the image processing chain. For example, the down-sampling may be carried out right at the input of the image post-processing unit 96, i.e. right on the image data as received from the image sensor driver 124. It is also possible that the image post-processing unit 96 applies other image processing, before carrying out down-sampling. Also, other image processing may be applied to the image data after down-sampling at the image post-processing unit 96. The down-sampling may be embedded into the image processing chain in such a way that the other image processing operations are applied to a larger number of pixels or a smaller number of pixels, depending what image size is desired for those other image processing operations.

Down-sampling of image data allows for speeding up the generation of the assembled image, because all ensuing image processing operations after the down-sampling can be carried out faster due to the reduced number of image pixels.

The ensuing image processing operations may comprise image processing on the individual image level in the image post-processing unit 96 and do comprise the assembly of the individual images in the image assembly unit 98. The assembled image data output may be provided faster and/or in a more easily processable size. Also, in case the assembled image data output is provided in a stepwise manner, the individual data packets may be provided in quicker succession and/or in a more easily processable size.

As pointed out above, the digital microscope system 100 of FIG. 4 has a full resolution mode and two reduced resolution sub-modes. On the basis of the user selection, the control unit 90 selects one of the full resolution mode and the two reduced resolution sub-modes. The control unit 90 further controls the image sensor driver 124 and the image post-processing unit 96 in accordance with the selected one of the full resolution mode and the two reduced resolution sub-modes.

According to the exemplary embodiment described with respect to FIG. 4, in the full resolution mode, the control unit 90 controls the image sensor driver 124 to read out image data from the image sensor 120 for the full number of predefined image pixels. Further, the control unit 90 controls the image post-processing unit 96 to not carry out any down-sampling on the image data, as received from the image sensor driver 124. For the exemplary case of the image sensor having 1920 pixels×1920 pixels, the individual images also have 1920 pixels×1920 pixels.

According to the exemplary embodiment described with respect to FIG. 4, in the first reduced resolution sub-mode, the control unit 90 controls the image sensor driver 124 to read out image data from the image sensor 120 for every third pixel in each of the two dimensions. Further, the control unit 90 controls the image post-processing unit to carry out down-sampling by a factor of 2 for each of the two dimensions. For the exemplary case of the image sensor having 1920 pixels×1920 pixels, the image sensor driver 124 provides image data for 640 pixels×640 pixels to the image post-processing unit 96, and the individual images have 320 pixels×320 pixels after down-sampling.

According to the exemplary embodiment described with respect to FIG. 4, in the second reduced resolution sub-mode, the control unit 90 controls the image sensor driver 124 to read out image data from the image sensor 120 for every third pixel in each of the two dimensions. Further, the control unit 90 controls the image post-processing unit to carry out down-sampling by a factor of 10 for each of the two dimensions. For the exemplary case of the image sensor having 1920 pixels×1920 pixels, the image sensor driver 124 provides image data for 640 pixels×640 pixels to the image post-processing unit 96, and the individual images have 64 pixels×64 pixels after down-sampling.

The image assembly unit 98 is configured to assemble the individual images into the assembled image. The assembled image may be presented to the user on a screen, as shown in FIG. 3, or saved into a file for viewing at a later point in time or provided to the user in any other suitable manner. Given the different number of pixels for the individual images in the full resolution mode and the first and second reduced resolution sub-modes, the image assembly unit 98 may take different amounts of time to assemble the individual images. In particular, the image assembly unit 98 may require less time for smaller individual images. The image assembly unit 98 may assemble the individual images via any suitable procedure, such as via suitable stitching algorithms, which are per se known. For the stitching to have high quality, individual images may be generated with an overlap between neighboring individual images.

In the exemplary embodiment of FIG. 4, the control unit 90 selects the one of the full resolution mode and the first and second reduced resolution sub-modes on the basis of the extension of the area of interest, as selected by the user. In particular, the control unit 90 may have two area thresholds. If the area of interest is smaller than a first area threshold, the full resolution mode is selected. If the area of interest is bigger than the first area threshold, but smaller than a second area threshold, the first reduced resolution sub-mode is selected. If the area of interest is bigger then the second area threshold, the second reduced resolution sub-mode is selected. The rationale behind these thresholds is as follows. The smaller the area of interest, the more likely it is that the user is interested in the very details of the sample, hence a better image quality, i.e. a higher resolution of the individual images, is provided.

Besides controlling the image sensor driver 124 and the image post-processing unit 96 in accordance with the user selection, the control unit 90 may further be configured to control the stage drive assembly 46 and the shutter 122 depending on the user selection. In particular, there may be different stage movement patterns for the full resolution mode and the first and second reduced resolution sub-modes. In particular, the different modes may differ with the respect to the image sensor capturing image data while the stage is moving or while the stage is in a stopped position.

In the exemplary embodiment of FIG. 4, in the full resolution mode, the image data is captured by the image sensor 20, when the stage is in a stopped position. In this way, no blurriness due to the movement of the stage is introduced, and the image quality is optimized. However, as the stage is stopped for every individual image, subsequent individual images may be generated at a non-maximum speed. The operation times of the stage drive assembly may be the limiting factor in generating the individual images and the assembled image.

In the exemplary embodiment of FIG. 4, in both the first reduced resolution sub-mode and the second reduced resolution sub-mode, the image data is captured by the image sensor 20, when the stage is moving. In particular, the stage may be moved with a first stage moving speed in the first reduced resolution sub-mode and with a second stage moving speed in the second reduced resolution sub-mode. The second stage moving speed is faster then the first stage moving speed. By capturing image data during the movement of the stage, the image data for subsequent individual images can be captured in quicker succession, thus enabling a quicker generation of individual images and of the assembled image. The capturing of image data during the movement of the stage works particularly well with the subsampling of the predefined number of pixels by the image sensor driver 124. As described above, the subsampling allows for a quick reading out of image data and makes the image sensor ready for capturing new image data quickly. This quick readiness may be taken advantage of by capturing image data in quick succession during the movement of the stage. The stage moving speed and the level of subsampling may be adapted to each other, depending on the properties and constraints of the technical components involved.

The first and second moving speeds may also be set in such a way that not more than an accepted level of blurriness is introduced into the assembled image. Various factors may be taken into account in this context. On the basis of the properties of the optical system and the physical pixel size in the image sensor, it may be determined what area of the sample relates to a pixel in the image sensor. Further, on the basis of the levels of subsampling and/or down-scaling, it may be determined what area of the sample relates to a pixel in the assembled image. Yet further, on the basis of the accepted level of blurriness in the assembled image, it may determined what maximum stage moving speed is acceptable for keeping the blurriness below the accepted level. The accepted level of blurriness may be defined in relation to the number of neighboring pixels of the assembled image that are affected by a given point in the sample. For example, it may be set as a quality criterion that any given point in the sample may only affect two pixels in the assembled image. This is also referred to as a blurriness of 1 pixel, because any given point in the sample may affect at most one more pixel than in a case where the image data is captured with the stage stopped. On the basis of the accepted level of blurriness of 1 pixel, the maximum stage moving speed may be set to the length of the area of the sample that relates to a pixel in the assembled image, divided by the shutter opening time for one image capturing operation by the image sensor. In case the reading out operation of the captured image data is significant as compared to the shutter opening time, the maximum stage moving speed may also be set to the length of the area of the sample that relates to a pixel in the assembled image, divided by the total capturing and processing time for one image capturing operation by the digital camera 20. Potential further constraints in transporting the image data out of the image sensor 120 to a memory that can provide the image data for further processing independent of the real time may also be taken into account. By setting the first and second stage moving speeds below the respective maximum stage moving speed, as set for the particular operating scenarios of the first and second reduced resolution sub-modes, the blurriness of the assembled image may be kept at an accepted level, while allowing for a very quick provision of the assembled image.

It is further possible that the desired pixel size of the assembled image is part of the user selection, as received by the control unit 90. In other words, the user selection may contain information on a desired resolution of the assembled image. For example, the number of pixels of the screen 70 may be part of the information conveyed to the control unit 90. The control unit 90 may be configured to select one of the full resolution mode and the one or more reduced resolution (sub-)modes on the basis of the extension of the area of interest and the desired resolution of the assembled image. For example, the control unit 90 may be configured to adapt the first and second area thresholds, as described above, depending on the desired resolution of the assembled image. In particular, the first and second area thresholds may be increased for higher desired resolutions. In this way, the quality of the assembled image may be adapted to the output medium and a high-quality assembled image may be presented to the user on the particular output medium used.

In order to allow the user to already work on the portion of the assembled image that is already available, the assembled image data may be displayed to the user in a stepwise manner. For example, when a new individual image becomes available from the image post-processing unit 96, the image assembly unit 98 may carry out stitching of this individual image to the previously received individual images. This process may also be considered as a stitching of the newly received individual image to an already available portion of the assembled image. The stitching operation may alter the image data of the individual image and may therefore be seen as a filter operation. The filtered individual image may be provided to the screen and may be displayed together with the previously available portion of the assembled image, thus increasing the available, displayed portion of the assembled image. On the screen, the user may experience this process as a stepwise building up of the assembled image. The efficiency of the user in analyzing the sample may thus be increased. For example, the display of the already available portion of the assembled image may put the user in a position to update the area of interest, e.g. via zooming in, before the whole assembled image is provided. It may also put the user in a position to find a particular feature he/she is looking for in the sample, before the whole assembled image is provided.

Figure 5:
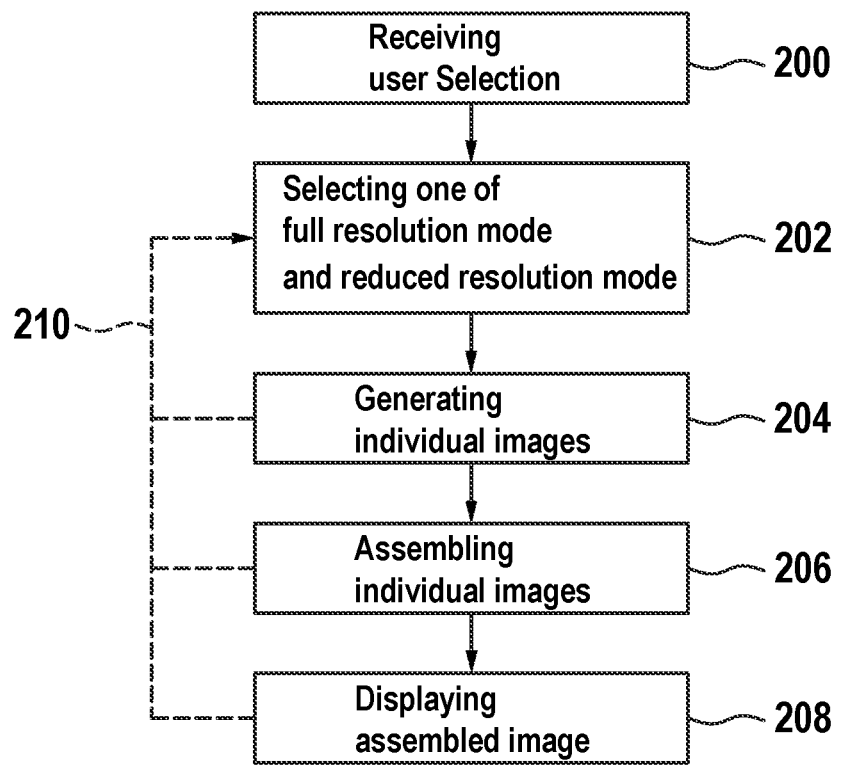
FIG. 5 shows a flow chart of a method of providing an assembled image using a digital microscope in accordance with an exemplary embodiment of the invention.

FIG. 5 shows a flow chart of a method of providing an assembled image using a digital microscope in accordance with an exemplary embodiment of the invention. At step 200, a user selection regarding an area of interest of the sample is received. At step 202, based on the user selection received at step 200, one of a full resolution mode and a reduced resolution mode, potentially one of a full resolution mode and a plurality of reduced resolution sub-modes, is selected. In accordance with the mode selected at step 202, individual images of individual portions of the area of interest are generated at step 204. For generating the individual images in accordance with the selected mode, all or a subset of the illumination assembly, the stage drive assembly, the shutter of the digital camera, the image sensor driver of the digital camera, and the image post-processing unit are controlled in accordance with the selected mode. At step 206, the individual images are assembled and the assembled image generated. At step 208, the assembled image is displayed on a screen to the user.

It is pointed out that the steps 204, 206, and 208 may be carried out in the depicted order. It is also possible that the steps 204, 206, and 208 are carried out in a partially parallel manner. As discussed above, the assembly of individual images and, potentially, also the display of the assembled image may already take place for a portion of the area of interest, while the individual images for another portion of the area of interest are still generated.

In the exemplary embodiment of FIG. 5, the method may be configured to react to an updated user selection regarding an updated area of interest at any point throughout the method. In particular, the method may be configured to interpret the reception of an updated user selection as an interrupt and stop the step or steps presently being carried out. The method may interpret the updated user selection as an interrupt and may go back to step 202 on the basis of the updated user selection. This is indicated with the dashed line 210 in FIG. 5, illustrating the receiving of the updated user selection, possible at any point throughout the method. It is possible that individual images, generated in the previous instance of step 204 and still relevant for the updated user selection, are re-used and not re-generated. In this way, the generation of the assembled image may be carried out very quickly for slight changes in the area of interest. Also, the portion of the assembled image that still related to the updated area of interest and that was already generated in the previous instance of step 206 may be continued to be displayed on the screen. It may be supplemented with further portions of the assembled image of the updated area of interest in a stepwise manner. In this way, downtimes of the screen, which may interfere with the user's analysis due to him/her having to adapt to a fully new display on the screen, may be prevented.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. A method of providing an assembled image using a digital microscope, the digital microscope having an optical system, an image sensor having a predefined number of image pixels, and a stage for holding a sample, the stage being movable in relation to the optical system and the image sensor, the method comprising:
receiving a user selection regarding an area of interest of the sample, the user selection indicating the position and extension of the area of interest;
depending on the user selection, selecting one of a full resolution mode, wherein individual images with the predefined number of image pixels are generated, or a reduced resolution mode, wherein individual images with a reduced number of image pixels, as compared to the predefined number of image pixels, are generated;
moving the stage with respect to the optical system and the image sensor, and generating individual images of the area of interest in accordance with the selected one of the full resolution mode or the reduced resolution mode;
combining the individual images into the assembled image, representing the area of interest; and
displaying the assembled image on a screen, with the individual images being displayed on the screen in a stepwise manner;
wherein the method further comprises:
receiving an updated user selection regarding an updated area of interest of the sample, the updated user selection indicating the position and extension of the updated area of interest;
interrupting the one or more method steps currently being carried out;
depending on the updated user selection, re-selecting one of the full resolution mode or the reduced resolution mode;
moving the stage with respect to the optical system and the image sensor, and generating individual images of the updated area of interest in accordance with the re-selected one of the full resolution mode or the reduced resolution mode; and
combining the individual images into the assembled image, representing the updated area of interest.

2. The method according to claim 1, wherein the individual images with the reduced number of image pixels are generated by subsampling the predefined number of image pixels of the image sensor.

3. The method according to claim 1, wherein the individual images with the reduced number of image pixels are generated by down-scaling of image data generated by the image sensor.

4. The method according to claim 1, wherein the stage is moved in an at least partly continuous manner in the reduced resolution mode, with the image sensor capturing image data for the individual images when the stage is moving.

5. The method according to claim 4, wherein a moving speed of the stage is selected such that a blurring of the image data is restricted to at most 2 pixels, in particular to at most 1 pixel.

6. The method according to claim 1, wherein the stage is moved in an intermittent manner in the full resolution mode, with the image sensor capturing image data for the individual images when the stage is in a stopped position.

7. The method according to claim 1, wherein the reduced resolution mode comprises a plurality of reduced resolution sub-modes and wherein the step of selecting one of a full resolution mode or a reduced resolution mode comprises selecting one of the full resolution mode or the plurality of reduced resolution sub-modes.

8. The method according to claim 7, wherein each of the plurality of reduced resolution sub-modes has a respective sub-mode specific reduced number of image pixels for the individual images.

9. The method according to claim 8, wherein the plurality of reduced resolution sub-modes differ in at least one of a level of subsampling the predefined number of image pixels of the image sensor, and a level of down-scaling of image data generated by the image sensor.

10. The method according to claim 1, wherein the user selection further indicates a representation resolution indicative of a desired resolution of the assembled image.

11. The method according to claim 1, wherein the user selection further indicates a representation resolution indicative of a screen resolution of a screen for depicting the assembled image.

12. A digital microscope system comprising:
an optical system;
an image sensor having a predefined number of image pixels;
a stage for holding a sample;
a stage drive assembly for moving the stage in relation to the optical system and the image sensor; and
a control unit for controlling generation of image data for an assembled image, wherein the control unit is configured to:
receive a user selection regarding an area of interest of the sample, the user selection indicating the position and extension of the area of interest;
depending on the user selection, select one of a full resolution mode, wherein individual images with the predefined number of image pixels are generated, or a reduced resolution mode, wherein individual images with a reduced number of image pixels, as compared to the predefined number of image pixels, are generated;
control the stage drive assembly to move the stage with respect to the optical system and the image sensor;
control the generation of individual images of the area of interest in accordance with the selected one of the full resolution mode or the reduced resolution mode; and
control the combination of the individual images into the assembled image, representing the area of interest; and
control a screen to display the assembled image, with the individual images being displayed on the screen in a stepwise manner;
wherein the control unit is further configured to:
receive an updated user selection regarding an updated area of interest of the sample, the updated user selection indicating the position and extension of the updated area of interest;

interrupt the one or more method steps currently being carried out;
   depending on the updated user selection, re-select one of the full resolution mode or the reduced resolution mode;
   control the stage drive assembly to move the stage with respect to the optical system and the image sensor;
   control the generation of individual images of the updated area of interest in accordance with the re-selected one of the full resolution mode or the reduced resolution mode; and
   control the combination of the individual images into the assembled image, representing the updated area of interest.

13. The digital microscope system according to claim 12, wherein the control unit is configured to control the generation of individual images in the reduced resolution mode by causing at least one of subsampling the predefined number of image pixels of the image sensor and down-scaling of image data generated by the image sensor.

14. The digital microscope system according to claim 12, wherein the control unit is configured to control the stage drive assembly to move the stage in an at least partly continuous manner in the reduced resolution mode and to control the image sensor to capture image data for the individual images when the stage is moving.

15. A non-transitory computer readable medium storing executable computer program instructions, the computer program instructions when executed cause a computer processor to carry out a method for providing an assembled image using a digital microscope, the digital microscope having an optical system, an image sensor having a predefined number of image pixels, and a stage for holding a sample, the stage being movable in relation to the optical system and the image sensor, the method comprising:
   receiving a user selection regarding an area of interest of the sample, the user selection indicating the position and extension of the area of interest;
   depending on the user selection, selecting one of a full resolution mode or a reduced resolution mode;
   instructing the stage to move with respect to the optical system;
   instructing the image sensor to generate image data;
   on the basis of the image data, generating individual images of the area of interest with the predefined number of image pixels, if the full resolution mode is selected, and generating individual images of the area of interest with a reduced number of image pixels, if the reduced resolution mode is selected;
   combining the individual images into the assembled image, representing the area of interest, and
   instructing a screen to display the assembled image, with the individual images being displayed on the screen in a stepwise manner;
   wherein the method further comprises:
      receiving an updated user selection regarding an updated area of interest of the sample, the updated user selection indicating the position and extension of the updated area of interest;
      interrupting the one or more method steps currently being carried out;
      depending on the updated user selection, re-selecting one of the full resolution mode or the reduced resolution mode;
      instructing the stage to move with respect to the optical system and the image sensor;
      instructing the image sensor to generate image data;
      on the basis of the image data, generating individual images of the updated area of interest in accordance with the re-selected one of the full resolution mode or the reduced resolution mode; and
      combining the individual images into the assembled image, representing the updated area of interest.

* * * * *